United States Patent [19]

Oshima et al.

[11] Patent Number: 4,923,655

[45] Date of Patent: May 8, 1990

[54] SEALING OF END FACES OF CERAMIC TUBES

[75] Inventors: Shinji Oshima, Ama; Hidenobu Misawa, Nagoya, both of Japan

[73] Assignee: NGK Insulators, Ltd., Japan

[21] Appl. No.: 205,356

[22] Filed: Jun. 10, 1988

[30] Foreign Application Priority Data

Jun. 17, 1987 [JP] Japan ................... 62-149229

[51] Int. Cl.$^5$ ............................. C04B 35/64
[52] U.S. Cl. ......................... 264/60; 264/63; 264/67; 264/317
[58] Field of Search .............. 264/60, 317, 67, 63

[56] References Cited

U.S. PATENT DOCUMENTS 4,559,193 12/1985 Ogawa et al. ................ 264/60

FOREIGN PATENT DOCUMENTS 62-85906  4/1987  Japan .
1113910  5/1968  United Kingdom ........... 264/60

Primary Examiner—James Derrington
Attorney, Agent, or Firm—Arnold, White & Durkee

[57] ABSTRACT

A process for sealing an end face of a ceramic tube is disclosed. The process includes the steps of inserting a porous member made of an organic material into one end of the ceramic tube after the ceramic tube is dried, and pouring and depositing a slurry into the ceramic tube on an axially outer side of the porous member, followed by drying and firing. The porous member is shaped to meet an inner shape of an end of the ceramic tube to be sealed. The slurry exhibits the same coefficient of thermal expansion as that of the ceramic tube during firing.

3 Claims, 3 Drawing Sheets

FIG_1a   FIG_1b   FIG_1c
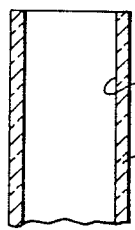 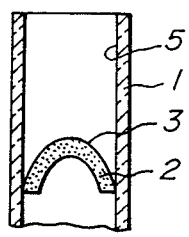 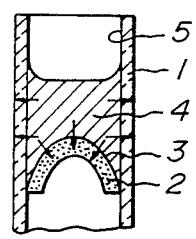
FIG_1d   FIG_1e
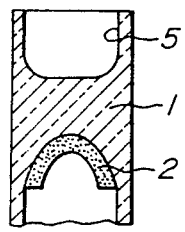 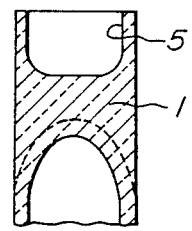

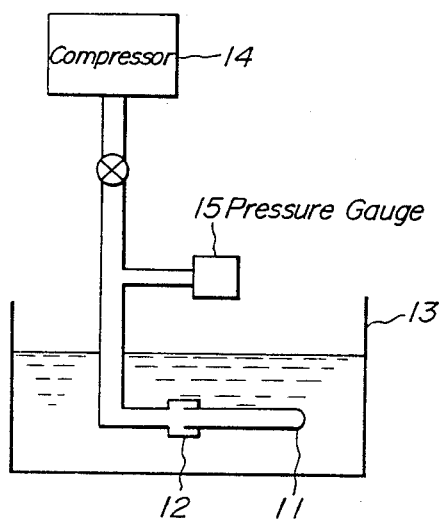
FIG_2

FIG._3a
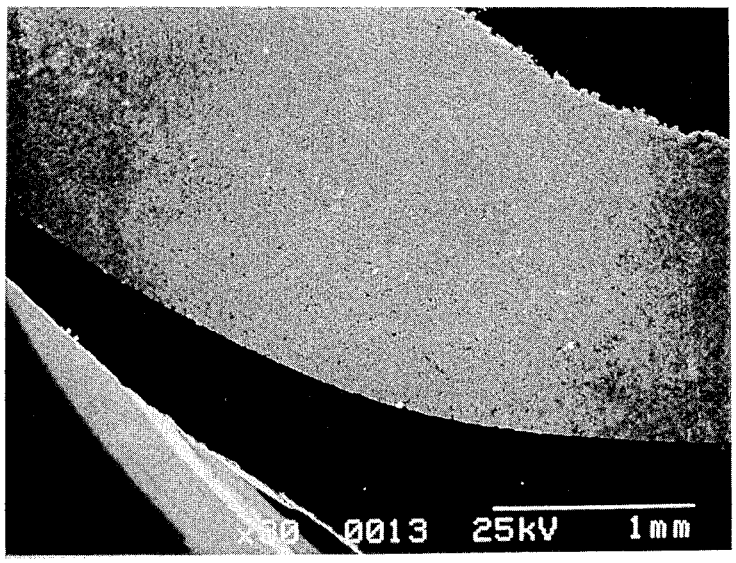
FIG._3b
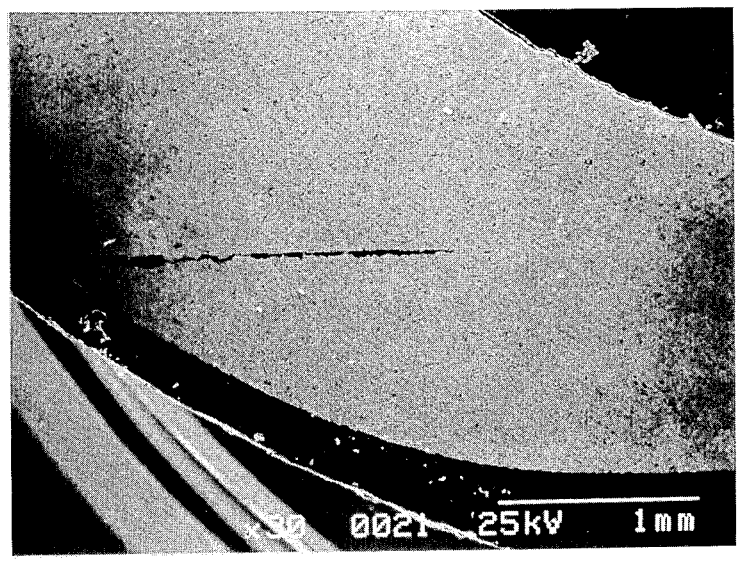

SEALING OF END FACES OF CERAMIC TUBES

BACKGROUND OF THE INVENTION

1. Field of the Invention

The present invention relates to a process for sealing end faces of extruded ceramic tubes.

2. Related Art Statement

When tubular bodies are to be shaped by extrusion, it has been impossible to obtain a tubular body having an end face sealed by a single extrusion step.

For this reason, when an end face of the extruded ceramic tube is to be sealed, it is a conventional practice that a dried member having the same composition as that of the ceramic tube is fixed to an end of the dried tubular body with an adhesive, and then the tube and dried member are fired to effect integration at the end.

However, the above-mentioned conventional end face-sealing technique requires use of a member having the same composition as that of the tube and exhibiting, when dried, a given shape to seal the end of the tube. As a result, a gap ranging from 5 to 10 μm is formed between the wall of the tube and the sealing member when the tubular product is integrated by firing. Thus, this unfavorably hinders complete integration. Consequently, ceramic tubes having such ends are likely to be broken, and are low in reliability.

SUMMARY OF THE INVENTION

It is an object of the present invention to solve the above-mentioned problems, and to provide a process for sealing end faces of ceramic. The process can completely integrate a tube end portion with a tubular wall when the end face is sealed and can also consequently offer a highly reliable end structure of the ceramic tubes.

In the process for sealing the end faces of the ceramic tubes according to the present invention, a porous member of an organic material is formed to meet the inner profile of an end portion of the tubular body to be sealed, and is then inserted into an extruded and dried ceramic tube. Then a slurry exhibiting the same coefficient of thermal expansion during firing as that of ceramic tube is poured and deposited into the ceramic tube on an axially outer side of the tube, followed by drying and firing.

In the above construction, since the organic material porous member is used, the porous member inserted is burnt off during firing of the tube. Further, the inner profile of the sealed portion can appropriately be selected by varying that of the porous member. In addition, since the slurry which exhibits the same coefficient of thermal expansion as that of the ceramic tube during the firing is directly poured and deposited into the dried ceramic tube, the region of material at the joined face becomes homogeneous. As a result, the same quality as that of integrally formed products can be obtained. Moreover, the density of the deposited portion of the tube can be controlled by adjusting the slurry with an organic additive such as a binder or a dispersant.

Furthermore, a material constituting the slurry is preferably the same as that of the ceramic tube, because there exists completely no difference in thermal expansion between them during firing.

These and other objects, features and advantages of the present invention will be appreciated upon reading the following description of the invention when taken in conjunction with the attached drawings, with the understanding that some modifications, variations and changes of the same could be made by the skilled person in the art to which the invention pertains without departing from the spirit of the invention or claims appended hereto.

BRIEF DESCRIPTION OF THE ATTACHED DRAWINGS

For a better understanding of the invention, reference is made to the attached drawings, wherein:

FIGS. 1(a) through (e) are views showing an example of the process for sealing an end face of a tube according to the present invention;

FIG. 2 is a schematic view of an apparatus for measuring an air-leaking time; and FIGS. 3(a) and (b) are SEM (Scanning Electronic Microscope) photographs of microstructures of a product produced according to the present invention and a product produced according to a conventional technique, respectively.

DETAILED DESCRIPTION OF THE INVENTION

Turning now to FIGS. 1(a) through (e), steps of a process for sealing an end face of a tube according to the present invention are illustrated by way of an example. As shown in FIG. 1(a), a ceramic tube 1 is shaped in a predetermined form by extrusion, and dried. Next, as shown in FIG. 1(b), a porous member 2 made of an organic material is inserted into one end of the dried ceramic tube 1. When the porous member 2 is inserted, it needs to be shaped such that a surface 3 at which the porous member contacts with a slurry is shaped to give a desired shape of an inner end of the sealed end portion. As the organic material porous member 2, use may be made of a water-absorbing material such as a filter paper or the like. Then, as shown in FIG. 1(c), a slurry 4 exhibiting the same coefficient of thermal expansion as that of the ceramic tube during firing or made of the same material as that of the ceramic tube 1 is poured inside the ceramic tube on an axially outer side of the porous member, and deposited there while water of the slurry is absorbed into the wall 5 of the tube 1 and the organic material porous member 2. Thereafter, as shown in FIG. 1(d), after drying, the organic material porous member 2 is burnt off by firing, thereby obtaining an end face-sealed ceramic tube having a predetermined inner end of the sealed portion as shown in FIG. 1(e). When is a practical use, a tip portion of the sealed end of the tube is removed. For instance, from the standpoint of dimension and mechanical strength, the tip portion of the sealed end of the ceramic tube is ground to give a substantially equal thickness as depicted by a broken line in FIG. 1(e).

An actual example of the process for sealing an end face of a ceramic tube will be explained in comparison with a conventional product.

End face-sealed ceramic tubes were prepared in the form of a test tube by the present invention and the conventional technique, and difference in the joined state between both of them was examined for comparison by using an air-leaking time. The air-leaking time was measured by using an apparatus as outlined in FIG. 2. First, a load was applied, by a compressor 14, to each of the thus prepared ceramic tubes 11 placed in water inside a water tank 13 at an initial stage pressure of 1.8 kg/cm² while the ceramic tube being supported by a connector 12, and then a time when the initial pressure of 1.8 kg/cm² was reduced to 0.5 kg/cm² by air leakage was measured by using a pressure gauge 15 and a timer (not shown). The thus measured time was taken as an air-leaking time. The ceramic tubes 11 used in this testing were porous bodies having porosity in a range from 30 to 35%. Results are shown in Table 1.

TABLE 1

|  | End-sealing method | Air leaking time |
|---|---|---|
| Conventional process | A plug was inserted and sealed into an end of the tube with an adhesive. The plug, the adhesive and the tube were made of the same material. | 30.6 sec |
| Present invention process | After a porous member was inserted, the slurry of the same material as that of the tube was poured and deposited. | 65.0 sec |

It was recognized from the experimental results that the conventional process was accompanied with the leakage at the joined portion at the end of the tube and the leakage occurred in a time less than a half of that in the case of the present invention, while in the present invention, the leakage uniformly occurred over the entire tube, and no leakage was seen from the joint at the end of the tube.

FIGS. 3(a) and (b) are SEM photographs of products according to the present invention and the conventional technique, respectively. FIG. 3(a) shows a joint portion of the product produced according to the present invention, and FIG. 3(b) shows that of the conventional product. As is evident from FIGS. 3(a) and (b), the conventional product shown in FIG. 3(b) has a gap at the joint portion, and is not completely joined. To the contrary, the invention product of FIG. 3(a) was completely uniformly joined. In the invention product of FIG. 3(a), a trace in which a buried porous member made of a resin was peeled off, but such did not pose any problem in the practical use.

The present invention is not limited to the example illustrated in the above, but many modifications, changes and variations may be possible. For instance, in the above example, a single wall tube was used as the ceramic tube. However, the sealing process according to the present invention is applicable for sealing end faces of double wall structure tubes in which ends cannot be integrally shaped.

Further, although the tip end is removed after the firing in the above example, it may be removed after the drying.

As is evident from the aforegoing detailed explanation, according to the end face-sealing process in the present invention, since a porous member of an organic material is inserted into an end face of an extruded ceramic tube and a slurry is then poured and deposited there, followed by firing, a product which is free from a joining trace and has the same quality as those integrally shaped can be obtained. The invention process may also favorably be applied for sealing end faces of tubes of a double wall structure in which the end portions cannot integrally be shaped. For instance, the invention process may be employed for protecting tubes for thermocouples, heat exchangers, etc.

What is claimed is:

1. A process for sealing an end face of a ceramic tube, comprising the steps of:
    inserting a porous member made of an organic material into the ceramic tube shaped by extrusion after the ceramic tube is dried, said porous member being shaped to meet an inner shape of an end portion of the ceramic tube to be sealed;
    pouring and depositing a slurry into one end of the ceramic tube on an axially outer side of the porous member, said slurry exhibiting the same coefficient of thermal expansion as that of the ceramic tube during firing; and
    drying and firing the ceramic tube and deposited slurry.

2. A process for sealing an end face of a ceramic tube according to claim 1, wherein the slurry is made of the same material as that of the ceramic tube, and after firing, is ground.

3. A process for sealing an end face of a ceramic tube according to claim 2, wherein the fired slurry is ground to give a substantially equal thickness.

* * * * *